Patented July 16, 1946

2,404,255

UNITED STATES PATENT OFFICE 2,404,255

RESINATE

Harold M. Spurlin, Marshallton, Del., assignor to Hercules Powder Company, Wilmington, Del., a corporation of Delaware No Drawing. Application August 16, 1943, Serial No. 498,877

15 Claims. (Cl. 260—100)

This invention relates to a new composition of matter and the method for its production. More particularly, it is concerned with a new resin compound and with a method for its production.

In accordance with this invention it has been found that aluminum dialkoxide monoresinates may be prepared, free of excess resin acids and impurities, by reacting aluminum trialkoxide with rosin in the proportion of 1 mol of aluminum trialkoxide to 1 mol of rosin. The method of this invention thus comprises reacting aluminum trialkoxide with rosin in the proportion of 1 mol of aluminum trialkoxide to 1 mol of rosin. The reaction may be carried out in the presence or absence of an anhydrous solvent which does not react with the product. If desired, the aluminum dialkoxide monoresinate may be used in solution, or the alcohol set free may be distilled off.

Having thus indicated the general nature and purpose of the invention, the following examples are given to illustrate the preparation of the new resin compound and are not to be construed as limiting the same. In the examples, the term "parts" represents weight units unless otherwise indicated.

Example 1

302 parts of rosin crystals and 204 parts of redistilled aluminum triisopropoxide and 800 parts of Varsol (a straight-run petroleum fraction, boiling between 300°–400° F.) were mixed and heated to 150° C. to distill off 60 parts of isopropyl alcohol. The product was a solution of aluminum diisopropoxide monoresinate. The addition of 3700 parts of dry isopropyl alcohol caused no precipitation as it would if the diresinate had been present.

Example 2

29 parts of rosin crystals were dissolved in 20 parts of dry butanol containing 20 parts of aluminum triisopropoxide. A homogeneous solution resulted. The addition of 15 parts of butanol caused the solution to become milky due to the precipitation of the monoresinate. The monoalkoxide diresinate is quite soluble in butanol.

Example 3

2.3 parts of granular aluminum were dissolved in 810 parts of anhydrous butanol at the refluxing temperature and, then while hot, a solution of 25 parts of abietic acid in anhydrous butanol was added to the aluminum tributoxide solution. Immediate precipitation of the aluminum dibutoxide monoresinate occurred. It was isolated by filtration and dried under vacuum at 70° C. 36.5 parts of aluminum dibutoxide monoresinate were obtained. The filtrate on evaporation to dryness gave only a 0.1 part residue. The ash content of the product was 11.7% (10.8% theory). The product was insoluble in cold and boiling acetone, alcohol, carbitol, and methyl cellosolve acetate, but was soluble in a high boiling petroleum fraction (boiling point about 163° C.) at temperatures above 155° C. and in boiling tetralin.

Example 4

2.3 parts of granular aluminum were dissolved in 810 parts of anhydrous butanol at the refluxing temperature, and then 28.7 parts of I wood rosin (acid number 162) in anhydrous butanol solution were added hot to the hot aluminum tributoxide solution. Immediate precipitation of the aluminum dibutoxide monoresinate occurred. The precipitate was filtered off and dried under vacuum at 50° C. 37.8 parts of aluminum dibutoxide monoresinate were obtained. The filtrate, on evaporation to dryness, yielded 3.3 parts of residue which contained the neutral bodies in the rosin. The ash content of the product was 11.03% (10.8% theory). It had the same characteristics as the product in Example 3.

As shown in the examples, the aluminum dialkoxide monoresinate is prepared by reacting aluminum trialkoxide and rosin in the proportion of 1 mol of aluminum trialkoxide to 1 mol of rosin, either with or without distilling off the alcohol set free. The aluminum trialkoxide may be prepared as illustrated in Examples 3 and 4, if so desired. While aluminum triisopropoxide and aluminum tributoxide have been used as the aluminum trialkoxides, other trialkoxides of aluminum, such as methoxide, ethoxide, propoxide, etc., may be used. However, it is preferable to use the triisopropoxide or tributoxide, since aluminum triisopropoxide and tributoxide are more readily prepared, the triisopropoxide being the lower boiling and, therefore, the more readily purified, and the methoxide and ethoxide are both quite insoluble in most solvents and, therefore, difficult to work with.

Reaction may be carried out in the presence or absence of an anhydrous solvent which does not react with the product. Hence, in place of Varsol and butanol shown in Example 1, other suitable solvents, such as a high boiling petroleum fraction (boiling point about 163° C.) at a temperature above 155° C., boiling tetralin, xylene, may be used. Lower boiling solvents may be used, but it is then more difficult to remove the alcohol set free in the reaction by distillation. In the case of oleoresin, the solvent may be the turpentine of the oleoresin. If it is desired to make use of a solution of aluminum dialkoxide monoresinate, a suitable solvent would be, for example, toluene, hexane, isopropyl ether, carbon tetrachloride. It is also advantageous to carry out the reaction in the presence of a solvent that can also be used as the solvent for the product.

Any of the solvents for the product may be used, and the alcohol set free in the reaction removed or not as may be desired.

Since the alkoxide group of the aluminum dialkoxide monoresinate is readily hydrolyzed by water, anhydrous conditions must be used in preparation of the monoresinate and dry solvents must be used.

The term "rosin" as defined herein and in the claims, and which may be used in the preparation of the aluminum dialkoxide monoresinates, includes any wood or gum rosin, rosin crystals, oleoresin, rosin acids obtainable therefrom, such as abietic acid, pimaric acid, sapinic acid, etc., as well as mixtures thereof. In addition, it includes the modified rosins, such as hydrogenated rosin, heat-treated rosin, polymerized rosin, and the like.

In carrying out the process described in the invention, an aluminum trialkoxide, such as, for example, aluminum triisopropoxide, and rosin are reacted in the proportion of 1 mol of aluminum trialkoxide to 1 mol of rosin, and, if desired, the alcohol set free may be distilled off. The reaction may be carried out in the presence or absence of an anhydrous solvent. If the alcohol has been driven off, butanol, acetone, or ethanol may be added to the residue and aluminum dialkoxide monoresinate will be precipitated as a resin. The product can be easily recovered by filtration. Any other suitable method of recovering the aluminum dialkoxide monoresinate may be used.

If a solution of aluminum dialkoxide monoresinate is desired, the rosin and aluminum trialkoxide may be dissolved, for example, in a hydrocarbon solvent, and a clear solution of aluminum dialkoxide monoresinate results.

There is thus provided by the invention a new composition of matter, aluminum dialkoxide monoresinate, free of excess acid and impurities, and a method for preparing it. The monoresinate is a definite compound which is relatively insoluble in cold and boiling acetone, alcohol, carbitol, and methyl cellosolve acetate. Furthermore, it is insoluble in butanol in contrast with the alkoxide diresinate and triresinate, both of which are quite soluble in this alcohol. It is, however, soluble in isopropyl alcohol.

What I claim and desire to protect by Letters Patent is:

1. As a product, an aluminum dialkoxide monoresinate selected from the group consisting of aluminum diisopropoxide monoresinate and aluminum dibutoxide monoresinate.

2. As a product, aluminum diisopropoxide monoresinate.

3. As a product, aluminum dibutoxide monoresinate.

4. The method of producing aluminum diisopropoxide monoresinate which comprises reacting under anhydrous conditions aluminum triisopropoxide and rosin in the proportion of 1 mol of aluminum triisopropoxide to 1 mol of rosin.

5. The method of producing aluminum diisopropoxide monoresinate which comprises reacting under anhydrous conditions aluminum triisopropoxide and rosin crystals in the proportion of 1 mol of aluminum triisopropoxide to 1 mol of rosin crystals.

6. The method of producing aluminum diisopropoxide monoresinate which comprises reacting aluminum triisopropoxide and rosin crystals in the proportion of 1 mol of aluminum triisopropoxide to 1 mol of rosin crystals in the presence of an anhydrous solvent.

7. The method of producing aluminum diisopropoxide monoresinate which comprises reacting aluminum triisopropoxide and rosin crystals in the proportion of 1 mol of aluminum triisopropoxide to 1 mol of rosin crystals in the presence of an anhydrous solvent, distilling off the alcohol set free, and recovering aluminum diisopropoxide monoresinate from the solution.

8. The method of producing aluminum diisopropoxide monoresinate which comprises reacting under anhydrous conditions aluminum triisopropoxide and polymerized rosin in the proportion of 1 mol of aluminum triisopropoxide to 1 mol of polymerized rosin.

9. The method of producing aluminum diisopropoxide monoresinate which comprises reacting aluminum triisopropoxide and polymerized rosin in the proportion of 1 mol of aluminum triisopropoxide to 1 mol of polymerized rosin in the presence of an anhydrous solvent.

10. The method of producing aluminum diisopropoxide monoresinate which comprises reacting aluminum triisopropoxide and polymerized rosin in the proportion of 1 mol of aluminum triisopropoxide to 1 mol of polymerized rosin in the presence of an anhydrous solvent, distilling off the alcohol set free, and recovering aluminum diisopropoxide monoresinate from the solution.

11. The method of producing aluminum diisopropoxide monoresinate which comprises reacting under anhydrous conditions aluminum triisopropoxide and hydrogenated rosin in the proportion of 1 mol of aluminum triisopropoxide to 1 mol of hydrogenated rosin.

12. The method of producing aluminum diisopropoxide monoresinate which comprises reacting aluminum triisopropoxide and hydrogenated rosin in the proportion of 1 mol of aluminum triisopropoxide to 1 mol of hydrogenated rosin in the presence of an anhydrous solvent.

13. The method of producing aluminum diisopropoxide monoresinate which comprises reacting aluminum triisopropoxide and hydrogenated rosin in the proportion of 1 mol of aluminum triisopropoxide to 1 mol of hydrogenated rosin in the presence of an anhydrous solvent, distilling off the alcohol set free, and recovering aluminum diisopropoxide monoresinate from the solution.

14. The method of producing an aluminum dialkoxide monoresinate which comprises reacting under anhydrous conditions an aluminum trialkoxide selected from the group consisting of aluminum triisopropoxide and aluminum tributoxide with rosin in the proportion of 1 mol of said aluminum alkoxide to 1 mol of rosin.

15. The method of producing an aluminum dialkoxide monoresinate which comprises reacting under anhydrous conditions an aluminum trialkoxide selected from the group consisting of aluminum triisopropoxide and aluminum tributoxide with rosin in the proportion of 1 mol of said aluminum trialkoxide to 1 mol of rosin, contacting the aluminum dialkoxide monoresinate so formed with anhydrous butanol, and separating said aluminum dialkoxide monoresinate in purified state as a residue insoluble in said butanol.

HAROLD M. SPURLIN.